(12) United States Patent
Boville, Sr.

(10) Patent No.: US 8,007,687 B2
(45) Date of Patent: Aug. 30, 2011

(54) SOLVENT

(76) Inventor: Lawrence A. Boville, Sr., Smithville, OH (US)

(*) Notice: Subject to any disclaimer, the term of this patent is extended or adjusted under 35 U.S.C. 154(b) by 162 days.

(21) Appl. No.: 12/380,249

(22) Filed: Feb. 25, 2009

(65) Prior Publication Data

US 2010/0213416 A1  Aug. 26, 2010

(51) Int. Cl.
- *B01F 1/00* (2006.01)
- *C09K 3/18* (2006.01)
- *C11D 3/02* (2006.01)
- *C11D 7/00* (2006.01)
- *C09D 9/00* (2006.01)
- *C09G 1/02* (2006.01)

(52) U.S. Cl. .......... 252/364; 252/69; 510/108; 510/201; 510/215; 510/342

(58) Field of Classification Search .......... 252/364, 252/69; 510/108, 201, 215, 342
See application file for complete search history.

(56) References Cited

U.S. PATENT DOCUMENTS

2002/0010117 A1* 1/2002 McDonald .................. 510/215

FOREIGN PATENT DOCUMENTS

JP 2007-031493 * 2/2007

OTHER PUBLICATIONS

Apr. 8, 2009 letter from attorney of record concerning admitted prior art based on public use ("Boville Solvent No. 1").

* cited by examiner

*Primary Examiner* — Ling-Siu Choi
*Assistant Examiner* — Monique Peets
(74) *Attorney, Agent, or Firm* — Sand & Sebolt

(57) ABSTRACT

An organic solvent which is very useful in paints is made up primarily of n-butyl acetate, n-heptane, methyl ethyl ketone, methyl isobutyl ketone, acetone and a light hydrotreated petroleum distillate. The solvent typically has a closed cup flash point of about 50 to 75° F. The petroleum distillate typically has a boiling range from 230 to 320° F., a closed cup flash point from 35 to 75° F. and a kauri-butanol value not less than 25. A mixture of 8-carbon and 9-carbon hydrocarbons which are typically primarily paraffins or cycloparaffins typically makes up the vast majority of the petroleum distillate.

29 Claims, No Drawings

US 8,007,687 B2

SOLVENT

BACKGROUND OF THE INVENTION

1. Technical Field

The present invention relates generally to organic solvents. More particularly, the present invention relates to an organic solvent configured to reduce hazardous air pollutants. Specifically, the invention relates to such an organic solvent which is especially useful in paints.

2. Background Information

It is well known that governmental regulations have increased over the last few decades in an effort to control pollution, including pollutants which have been associated with various types of organic solvents. For example, the United States Environmental Protection Agency (EPA) has listed various hazardous air pollutants (HAPs) which are considered to be significantly hazardous to human health and/or the environment at large. Partially in response to such regulations, many efforts have been made to produce solvents and other chemicals which minimize or eliminate HAPs or other substances which are considered pollutants or hazardous in some form or fashion. The paint industry and many other industries use a considerable amount of solvents and thus there is a need in the art for organic solvents which minimize pollutants as well as serve effectively as solvents for paint and for other purposes. The solvent of the present invention addresses these needs.

BRIEF SUMMARY OF THE INVENTION

The present invention provides a solvent comprising: 4.0 to 8.0% by volume n-butyl acetate; 8.0 to 16.0% by volume n-heptane; 15.0 to 25.0% by volume methyl ethyl ketone; 8.0 to 16.0% by volume methyl isobutyl ketone; 20.0 to 30.0% by volume acetone; and 20.0 to 30.0% by volume of a light hydrotreated petroleum distillate having a boiling range of about 230 to 320° F., a closed cup flash point of about 35 to 75° F. and a kauri-butanol value not less than 25.

The present invention also provides a solvent comprising: 4.0 to 8.0% by volume n-butyl acetate; 8.0 to 16.0% by volume n-heptane; 15.0 to 25.0% by volume methyl ethyl ketone; 8.0 to 16.0% by volume methyl isobutyl ketone; 20.0 to 30.0% by volume acetone; and 20.0 to 30.0% by volume of a light hydrotreated petroleum distillate at least 90% of which is made up of a mixture of 8-carbon and 9-carbon hydrocarbons.

The present invention further provides a solvent comprising: 4.0 to 8.0% by volume n-butyl acetate; 8.0 to 16.0% by volume n-heptane; 15.0 to 25.0% by volume methyl ethyl ketone; 8.0 to 16.0% by volume methyl isobutyl ketone; 20.0 to 30.0% by volume acetone; and 20.0 to 30.0% by volume of a petroleum distillate which comprises by volume 20 to 50% 8-carbon hydrocarbons and 50 to 80% 9-carbon hydrocarbons.

DETAILED DESCRIPTION OF THE INVENTION

The solvent of the present invention may be used for various purposes and is particularly suited for use as a solvent or thinner in paints. As shown further below, test results were excellent for a certain paint mixture utilizing the solvent of the present invention. Preferably, the solvent contains reduced levels of hazardous air pollutants (HAPs) and little if any toluene, also known as toluol.

The primary components of the solvent of the present invention are n-butyl acetate (CAS No. 123-864), which has a boiling point of about 257° F. (125° C.) and a closed cup flash point of about 81° F. (27° C.); n-heptane (CAS No. 142-82-5), which has a boiling point of about 209° F., (98° C.) and a closed cup flash point of about 25° F. (−4° C.); methyl ethyl ketone or MEK (CAS No. 78-93-3), which has a boiling point of about 175° F. (80° C.) and a closed cup flash point of about 16° F. (−9° C.); methyl isobutyl ketone or MIBK (CAS No. 108-10-1), which has a boiling point of about 243° F. (117° C.) and a closed cup flash point of about 61° F. (16° C.); acetone (CAS No. 67-64-1), which has a boiling point of about 133° F. (56° C.) and a closed cup flash point of about −4° F. (−20° C.); and a light hydrotreated petroleum distillate which typically has a boiling range of about 230 to 320° F. (110 to 160° C.), a closed cup flash point of about 35 to 75° F. (2 to 24° C.), and a kauri-butanol value not less than about 25. This petroleum distillate is typically associated with the CAS No. 64742-49-0 although this number refers more to the method of obtaining the distillate than the specific composition thereof. The six primary components noted above typically make up the vast majority of the solvent of the present invention. The solvent may contain additives such as ethylene glycol, butyl solusol, varnish makers and painters (VM&P) naphtha (having for example about a 105° F. flash point) or other suitable additives which may be used to slow the drying process, for example. While various other components may also be present in the solvent, the six primary components noted above typically make up somewhere in the range of 90 to 100 percent of the solvent by volume. Typically, these six primary components make up 95 to 100 percent or any percentage therebetween. It is noted that the various percentages recited herein, such as with the present solvent and its components, are by volume unless otherwise stated herein.

While there may be some variation, n-butyl acetate typically makes up by volume 4.0 to 8.0 percent of the solvent with narrower ranges of 4.3 to 7.6 percent, 4.7 to 7.3 percent, 5.0 to 7.0 percent, 5.4 to 6.6 percent and 5.7 to 6.3 percent, with the exemplary embodiment being about 6.0 percent. Likewise, n-heptane typically makes up by volume 8.0 to 16.0 percent of the solvent, with narrower ranges of 9.0 to 15.0 percent, 9.6 to 14.4 percent, 10.2 to 13.8 percent, 10.8 to 13.2 percent and 11.4 to 12.6 percent, with the exemplary embodiment being about 12 percent. Methyl ethyl ketone typically makes up by volume about 15.0 to 25.0 percent of the solvent with narrower ranges of 16.0 to 24.0 percent, 17.0 to 23.0 percent, 18.0 to 22.0 percent and 19.0 to 21.0 percent, with the exemplary embodiment being about 20.0 percent. Methyl isobutyl ketone makes up about the same amount of the solvent by volume as does n-heptane whereby the percentages listed with regard to n-heptane are likewise applicable to methyl isobutyl ketone. Acetone typically makes up by volume about 20.0 to 30.0 percent of the solvent, with narrower ranges of 21.0 to 29.0 percent, 22.0 to 28.0 percent, 23.0 to 27.0 percent and 24.0 to 26.0 percent, with the exemplary embodiment being about 25.0 percent. The petroleum distillate also falls within the ranges recited with regard to acetone.

In the exemplary embodiment, acetone and the petroleum distillate together make up by volume about 43.0 to 55.0 percent, with narrower ranges of about 44.0 to 54.0 percent, 45.0 to 53.0 percent, 46.0 to 52.0 percent, 47.0 to 51.0 percent and 48.0 to 50.0 percent, most typically being about 49.0 percent. The closed cup flash point of the petroleum distillate ranges from about 35, 40, 45, 50, 55 or 60° F. to about 70 or 75° F. This flash point is more typically within the range of about 50 or 55° F. to about 70 or 75° F. and even more typically within the range of about 60 to 70° F. and is usually on the order of about 65° F. In the exemplary embodiment, the petroleum distillate is made up primarily of a mixture of 8-carbon hydrocarbons and 9-carbon hydrocarbons. Typically, the vast majority of these 8-carbon and 9-carbon hydrocarbons (respectively C8 and C9) are paraffins and/or cycloparaffins. Typically, C8 and C9 make up at least 90 percent of the petroleum distillate and more typically a substantially higher percentage. For instance, C8 and C9 together typically make up at least 91, 92, 93, 94, 95, 96, 97, 98 or 99 percent of the petroleum distillate. The amount of paraffins and cycloparaffins making up the petroleum distillate also fall within the range recited for C8 and C9. In the exemplary embodiment, all or substantially all of the C8 and C9 are paraffins and/or cycloparaffins.

A suitable light hydrotreated petroleum distillate for use in the present solvent is sold under the name Special Naphtholite 66/3 (referred to herein as SN66/3) by CITGO Petroleum Corporation of Rolling Meadows, Ill. The SN66/3 petroleum distillate is in part hydrotreated to reduce aromatics and olefins and meets the definition of non-photochemically reactive under the requirements of "Rule 66—Organic Solvents" instituted in San Diego, Calif. by the San Diego County Air Pollution Control District. Specific maximum limitations of various components are laid out in Rule 66 in paragraph (I) thereof, the pertinent portion of which is reproduced immediately below:

(I) The compositional limitations of any organic solvent referred to in this rule are the volume percentages of the following photochemically reactive compounds, compared to the total solvent volume:
1. A combination of hydrocarbons, alcohols, aldehydes, esters, ethers, or ketones having an olefinic or cyclo-olefinic type of unsaturation: 5 percent.
2. A combination of aromatic compounds with eight or more carbon atoms to the molecule, except ethylbenzene: 8 percent.
3. A combination of ethylbenzene, ketones having branched hydrocarbon structures, trichloroethylene or toluene: 20 percent.
4. Any aggregate of (1), (2), or (3) above, provided their individual volume percentages are not exceeded: 20 percent.

Thus, the petroleum distillate used in the solvent of the present invention complies with the above noted requirements of Rule 66. In addition, the solvent of the present invention likewise is within the maximum requirements of paragraph (I) of Rule 66. Indeed, SN66/3 and the solvent typically meet much more stringent requirements than those required by paragraph (I) of Rule 66. For instance, whereas the combination of paragraph (1)(1) has a maximum limit of 5%, SN66/3 and the solvent typically have a corresponding maximum of 1% or less. Likewise, SN66/3 and the solvent typically have no more than 5% and typically 1% or less of the combination of aromatic compounds noted in paragraph (1)(2) of Rule 66; no more than 15%, 10%, 5%, 2% or 1% of the combination of paragraph (1)(3) of Rule 66; and typically no more than 15%, 10%, 5%, 3%, 2% or 1% of the aggregate listed in paragraph (1)(4) of Rule 66.

Moreover, SN66/3 and the solvent typically have a content by volume of aromatic compounds which is no greater than 10% and typically no more than 5%, 4%, 3%, 2% or 1%. In the exemplary embodiment, SN66/3 and the solvent contain no more than 5% toluene and more typically no more than 1% toluene and usually less than 0.1%. Typically, SN66/3 and the solvent contain substantially less than 1.0% benzene, typically less than 0.005% and usually less than 0.002%. Likewise, SN66/3 and the solvent typically contain substantially less than 1.0% ethylbenzene, most typically less than 0.1%.

The solvent and SN66/3 also typically contain no more than a minute amount of naphthalene, typically less than 0.005% and usually less than 0.002%. The solvent and SN66/3 normally contain no more than 5% olefins, usually no more than 1% and typically less than 0.1%. The sulfur content of the solvent and SN66/3 is typically no more than five parts per million and more typically less than one part per million.

As previously noted, the petroleum distillate of the solvent is formed primarily of C8 and C9. More particularly, and with particular reference to use of SN66/3 as the petroleum distillate, the petroleum distillate typically is made up of about 20, 25, 30 or 35 percent to about 40, 45 or 50 percent C8 and about 50, 55, or 60 percent to about 60, 65, 70, 75 or 80 percent of C9. As previously noted, the vast majority of the petroleum distillate is formed of paraffins and/or cycloparaffins. While the respective percentages of paraffins and cycloparaffins found in the petroleum distillate may vary substantially, SN66/3 most typically is made up of about 25 to 50 percent paraffins and in the exemplary embodiment somewhere in the range of about 30 to 45 percent while the cycloparaffins typically make up about 50 to 75 percent of SN66/3 and in the exemplary embodiment about 55 to 70 percent. The amount of paraffins and cycloparaffins typically making up the petroleum distillate is noted further above. The kauri-butanol value of SN66/3 is typically in the range of about 25 to 40, more typically in the range of about 30 to 40 and in the exemplary embodiment is typically on the order of about 35 or 36.

Table 1 below reproduces the list of hazardous air pollutants (HAPs) found in Title I, Section 112 (b)(1) of the United States Clean Air Act, as subsequently modified. Other than methyl isobutol ketone, the solvent of the present invention preferably contains no more than 5.0% by volume of any of the chemicals alone or in the aggregate on the list of HAPs found in Table I, and preferably no more than 1.0% of said chemicals alone or in the aggregate.

TABLE 1

| CAS No. | Chemical Name |
|---|---|
| 75070 | Acetaldehyde |
| 60355 | Acetamide |
| 75058 | Acetonitrile |
| 98862 | Acetophenone |
| 53963 | 2-Acetylaminofluorene |
| 107028 | Acrolein |
| 79061 | Acrylamide |
| 79107 | Acrylic acid |
| 107131 | Acrylonitrile |
| 107051 | Allyl chloride |
| 92671 | 4-Aminobiphenyl |
| 62533 | Aniline |
| 90040 | o-Anisidine |
| 1332214 | Asbestos |
| 71432 | Benzene (including benzene from gasoline) |
| 92875 | Benzidine |
| 98077 | Benzotrichloride |
| 100447 | Benzyl chloride |
| 92524 | Biphenyl |
| 117817 | Bis(2-ethylhexyl)phthalate (DEHP) |
| 542881 | Bis(chloromethyl)ether |
| 75252 | Bromoform |
| 106990 | 1,3-Butadiene |
| 156627 | Calcium cyanamide |
| 133062 | Captan |
| 63252 | Carbaryl |
| 75150 | Carbon disulfide |
| 56235 | Carbon tetrachloride |
| 463581 | Carbonyl sulfide |

TABLE 1-continued

| CAS No. | Chemical Name |
|---|---|
| 120809 | Catechol |
| 133904 | Chloramben |
| 57749 | Chlordane |
| 7782505 | Chlorine |
| 79118 | Chloroacetic acid |
| 532274 | 2-Chloroacetophenone |
| 108907 | Chlorobenzene |
| 510156 | Chlorobenzilate |
| 67663 | Chloroform |
| 107302 | Chloromethyl methyl ether |
| 126998 | Chloroprene |
| 1319773 | Cresols/Cresylic acid (isomers and mixture) |
| 95487 | o-Cresol |
| 108394 | m-Cresol |
| 106445 | p-Cresol |
| 98828 | Cumene |
| 94757 | 2,4-D, salts and esters |
| 3547044 | DDE |
| 334883 | Diazomethane |
| 132649 | Dibenzofurans |
| 96128 | 1,2-Dibromo-3-chloropropane |
| 84742 | Dibutylphthalate |
| 106467 | 1,4-Dichlorobenzene(p) |
| 91941 | 3,3-Dichlorobenzidene |
| 111444 | Dichloroethyl ether (Bis(2-chloroethyl)ether) |
| 542756 | 1,3-Dichloropropene |
| 62737 | Dichlorvos |
| 111422 | Diethanolamine |
| 121697 | N,N-Dimethylaniline |
| 64675 | Diethyl sulfate |
| 119904 | 3,3-Dimethoxybenzidine |
| 60117 | Dimethyl aminoazobenzene |
| 119937 | 3,3'-Dimethyl benzidine |
| 79447 | Dimethyl carbamoyl chloride |
| 68122 | Dimethyl formamide |
| 57147 | 1,1-Dimethyl hydrazine |
| 131113 | Dimethyl phthalate |
| 77781 | Dimethyl sulfate |
| 534521 | 4,6-Dinitro-o-cresol, and salts |
| 51285 | 2,4-Dinitrophenol |
| 121142 | 2,4-Dinitrotoluene |
| 123911 | 1,4-Dioxane (1,4-Diethyleneoxide) |
| 122667 | 1,2-Diphenylhydrazine |
| 106898 | Epichlorohydrin (1-Chloro-2,3-epoxypropane) |
| 106887 | 1,2-Epoxybutane |
| 140885 | Ethyl acrylate |
| 100414 | Ethyl benzene |
| 51796 | Ethyl carbamate (Urethane) |
| 75003 | Ethyl chloride (Chloroethane) |
| 106934 | Ethylene dibromide (Dibromoethane) |
| 107062 | Ethylene dichloride (1,2-Dichloroethane) |
| 107211 | Ethylene glycol |
| 151564 | Ethylene imine (Aziridine) |
| 75218 | Ethylene oxide |
| 96457 | Ethylene thiourea |
| 75343 | Ethylidene dichloride (1,1-Dichloroethane) |
| 50000 | Formaldehyde |
| 76448 | Heptachlor |
| 118741 | Hexachlorobenzene |
| 87683 | Hexachlorobutadiene |
| 77474 | Hexachlorocyclopentadiene |
| 67721 | Hexachloroethane |
| 822060 | Hexamethylene-1,6-diisocyanate |
| 680319 | Hexamethylphosphoramide |
| 110543 | Hexane |
| 302012 | Hydrazine |
| 7647010 | Hydrochloric acid |
| 7664393 | Hydrogen fluoride |
| 123319 | Hydroquinone |
| 78591 | Isophorone |
| 58899 | Lindane (all isomers) |
| 108316 | Maleic anhydride |
| 67561 | Methanol |
| 72435 | Methoxychlor |
| 74839 | Methyl bromide (Bromomethane) |
| 74873 | Methyl chloride (Chloromethane) |
| 71556 | Methyl chloroform (1,1,1-Trichloroethane) |
| 60344 | Methyl hydrazine |
| 74884 | Methyl iodide (Iodomethane) |
| 108101 | Methyl isobutyl ketone (Hexone) |
| 624839 | Methyl isocyanate |
| 80626 | Methyl methacrylate |
| 1634044 | Methyl tert butyl ether |
| 101144 | 4,4-Methylene bis (2-chloroaniline) |
| 75092 | Methylene chloride (Dichloromethane) |
| 101688 | Methylene diphenyl diisocyanate (MDI) |
| 101779 | 4,4'-Methylenedianiline |
| 91203 | Naphthalene |
| 98953 | Nitrobenzene |
| 92933 | 4-Nitrobiphenyl |
| 100027 | 4-Nitrophenol |
| 79469 | 2-Nitropropane |
| 684935 | N-Nitroso-N-methylurea |
| 62759 | N-Nitrosodimethylamine |
| 59892 | N-Nitrosomorpholine |
| 56382 | Parathion |
| 82688 | Pentachloronitrobenzene (Quintobenzene) |
| 87865 | Pentachlorophenol |
| 108952 | Phenol |
| 106503 | p-Phenylenediamine |
| 75445 | Phosgene |
| 7803512 | Phosphine |
| 7723140 | Phosphorus |
| 85449 | Phthalic anhydride |
| 1336363 | Polychlorinated biphenyls (Aroclors) |
| 1120714 | 1,3-Propane sultone |
| 57578 | beta-Propiolactone |
| 123386 | Propionaldehyde |
| 114261 | Propoxur (Baygon) |
| 78875 | Propylene dichloride (1,2-Dichloropropane) |
| 75569 | Propylene oxide |
| 75558 | 1,2-Propylenimine (2-Methyl aziridine) |
| 91225 | Quinoline |
| 106514 | Quinone |
| 100425 | Styrene |
| 96093 | Styrene oxide |
| 1746016 | 2,3,7,8-Tetrachlorodibenzo-p-dioxin |
| 79345 | 1,1,2,2-Tetrachloroethane |
| 127184 | Tetrachloroethylene (Perchloroethylene) |
| 7550450 | Titanium tetrachloride |
| 108883 | Toluene |
| 95807 | 2,4-Toluene diamine |
| 584849 | 2,4-Toluene diisocyanate |
| 95534 | o-Toluidine |
| 8001352 | Toxaphene (chlorinated camphene) |
| 120821 | 1,2,4-Trichlorobenzene |
| 79005 | 1,1,2-Trichloroethane |
| 79016 | Trichloroethylene |
| 95954 | 2,4,5-Trichlorophenol |
| 88062 | 2,4,6-Trichlorophenol |
| 121448 | Triethylamine |
| 1582098 | Trifluralin |
| 540841 | 2,2,4-Trimethylpentane |
| 108054 | Vinyl acetate |
| 593602 | Vinyl bromide |
| 75014 | Vinyl chloride |
| 75354 | Vinylidene chloride (1,1-Dichloroethylene) |
| 1330207 | Xylenes (isomers and mixture) |
| 95476 | o-Xylenes |
| 108383 | m-Xylenes |
| 106423 | p-Xylenes |
| 0 | Antimony Compounds |
| 0 | Arsenic Compounds (inorganic including arsine) |
| 0 | Beryllium Compounds |
| 0 | Cadmium Compounds |
| 0 | Chromium Compounds |
| 0 | Cobalt Compounds |
| 0 | Coke Oven Emissions |
| 0 | Cyanide Compounds 1 |
| 0 | Glycol ethers 2 |
| 0 | Lead Compounds |
| 0 | Manganese Compounds |
| 0 | Mercury Compounds |
| 0 | Fine mineral fibers 3 |
| 0 | Nickel Compounds |
| 0 | Polycylic Organic Matter 4 |

TABLE 1-continued

| CAS No. | Chemical Name |
|---|---|
| 0 | Radionuclides (including radon) 5 |
| 0 | Selenium Compounds |

TABLE 1 Notes:
For all listings above which contain the word "compounds" and for glycol ethers, the following applies: Unless otherwise specified, these listings are defined as including any unique chemical substance that contains the named chemical (i.e., antimony, arsenic, etc.) as part of that chemical's infrastructure.
1. X'CN where X = H' or any other group where a formal dissociation may occur. For example KCN or Ca(CN).
2. Includes mono- and di-ethers of ethylene glycol, diethylene glycol, and triethylene glycol R—(OCH2CH2)n—OR where n = 1, 2, or 3; R = alkyl or aryl groups R' = R, H, or groups which, when removed, yield glycol ethers with the structure: R—(OCH2CH)n—OH. Polymers are excluded from the glycol category.
3. Includes mineral fiber emissions from facilities manufacturing or processing glass, rock, or slag fibers (or other mineral derived fibers) of average diameter 1 micrometer or less.
4. Includes organic compounds with more than one benzene ring, and which have a boiling point greater than or equal to 100° C.
5. A type of atom which spontaneously undergoes radioactive decay.

It is noted that the following compounds were originally listed as HAPs under the Clean Air Act, but have been delisted: Caprolactam (CAS No. 105-60-2), Hydrogen sulfide (CAS No. 7783-064), and Methyl ethyl ketone (2-Butanone) (CAS No. 78-93-3).

One preferred embodiment of the solvent of the present invention was used as a solvent or thinner for a primer paint and a topcoat paint which were sprayed onto several panels which were subsequently submitted to humidity exposure and salt spray/fog exposure tests, the results of which are shown respectively in Tables 2 and 3 further below. In particular, the preferred embodiment of the solvent contained by volume about 6.0% n-butyl acetate, 12.0% n-heptane, 20.06% methyl ethyl ketone, 12.25% methyl isobutyl ketone, 24.69% acetone, and 25.0% SN66/3. In one testing scenario, the results of which are in Table 2, several panels formed of cold rolled steel (CRS) were sprayed with a primer, which was subsequently sprayed with a top coat and thereafter submitted to the humidity and salt/fog exposure tests. One set of the panels was first blasted with an abrasive etching material, and then sprayed with the primer and the topcoat thereafter. The primer used was the Sherwin-Williams 2.8 VOC Catalyzed Epoxy Primer using the solvent of the present invention in place of the solvent normally used by Sherwin-Williams. A pair of the panels were not blasted, and instead of being sprayed with the primer were pretreated with a Bonderite 1000 (B1000) pretreatment prior to being topcoated. Bonderite 1000 is a brand name of Henkel AG & Co. KGaA, headquartered in Dusseldorf, Germany. The topcoat used to coat the primer and Bonderite 1000 respectively is in particular one of the Sherwin-Williams Polane® series, which are catalyzed polyurethane paints. As with the primer, the preferred embodiment of the present solvent was used with the Polane® series topcoat paint in place of the solvent normally used by Sherwin-Williams. In particular, the topcoat paint was either a high gloss orange or a low gloss black.

Six of the steel panels, including four blasted panels and the two non-blasted panels treated with Bonderite 1000, were exposed for 1500 hours in a salt spray/fog cabinet operated according to ASTM B-117, Standard Practice for Operating Salt Spray (Fog) Apparatus. Two of the blasted steel panels were exposed in a humidity cabinet operated according ASTM D-2247, Standard Practice for Testing Water Resistance of Coatings in 100% Relative Humidity. The panels were evaluated as shown in Table 2 according to ASTM D-610, Standard Test Method for Evaluating Degree of Rusting on Painted Steel Surfaces; ASTM D-714, Standard Test Method For Evaluating Degree of Blistering of Paints; ASTM D-1654, Standard Test Method for Evaluation of Painted or Coated Specimens Subjected to Corrosive Environments; and ASTM D-3359, Standard Test Methods for Measuring Adhesion by Tape Test.

TABLE 2

| Test | Panel | Substrate | Color | Rust ASTM D-610 | Blisters ASTM D-714 | Creepage ASTM D-1654 | Scrape Adhesion ASTM D-1654 | Tape Adhesion ASTM D-3359 |
|---|---|---|---|---|---|---|---|---|
| Salt Fog ASTM B-117 | 1 | Blasted Steel | Orange | 10 | 4 blisters Size #2 | 9 | 10 | 5B |
| Salt Fog ASTM B-117 | 2 | Blasted Steel | Orange | 10 | 1 blister Size #2 | 8 | 10 | 5B |
| Salt Fog ASTM B-117 | 3 | Blasted Steel | Black | 10 | 3 blisters Size #2 | 9 | 10 | 5B |
| Salt Fog ASTM B-117 | 4 | Blasted Steel | Black | 10 | 4 blisters Size #2 | 9 | 10 | 5B |
| Salt Fog ASTM B-117 | 5 | CRS, B1000 | Black | 10 | None | 7 | 10 | 5B |
| Humidity ASTM D-2247 | 6 | CRS, B1000 | Orange | 10 | None | 1 | 0 | 5B |

TABLE 2-continued

| | | | | | | | | |
|---|---|---|---|---|---|---|---|---|
| Humidity ASTM D-2247 | 7 | Blasted Steel | Orange | 10 | None | N/A | N/A | 5B |
| Humidity ASTM D-2247 | 8 | Blasted Steel | Black | 10 | None | N/A | N/A | 5B |

Table 2 Notes:
1. ASTM pictorial references were used to rate blisters and adhesion.
2. The ASTM Standardized Scoring System shown below was used for D-610 and D-1654.

| Score | Performance | or | Effect |
|---|---|---|---|
| 10 | Perfect | | None |
| 9 | Excellent | | Trace |
| 8 | Very Good | | Very Slight |
| 6 | Good | | Slight |
| 4 | Fair | | Moderate |
| 2 | Poor | | Considerable |
| 1 | Very Poor | | Severe |
| 0 | No Value | | Complete Failure |

3. The salt spray/fog exposure of panel No. 6 was stopped after 250 hours due to delamination from the substrate. The failure of panel No. 6 was deemed to be the result of high film thickness and likely was also due to premature application of the topcoat to the primer.

As shown in Table 2 above, the results of the humidity and salt/fog exposure tests were excellent other than panel No. 6 as noted in the Table 2 footnotes. A score of 8 or 9 is usually considered high for the ASTM D-610 and D-1654 tests.

Table 3 below illustrates the results of humidity and salt/fog exposure of panels which were coated with a primer only. In particular, the salt spray or fog panels included back spray priming, edge priming and an "X" scribe on a test panel and a control panel. The panel that was exposed to humidity testing was also back spray primed and edge primed. The two test panels used the same primer as noted above with regard to Table 2, namely the Sherwin Williams 2.8 VOC Catalyzed Epoxy Primer utilizing the solvent of the present invention. The control panel used the same primer with the standard Sherwin-Williams solvent.

minimal use of other HAPs. Applicant reserves the right to claim any percentages within the specified ranges noted herein in any suitable increments, which are otherwise not specified in order to shorten the listing of such incremental percentages.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

TABLE 3

| Test | Panel | Blisters ASTM D-714 | Rust ASTM D-610 | Corrosion ASTM D-1654 | Salt Spray/Humidity Rating |
|---|---|---|---|---|---|
| 500 hour Salt Spray | Control Panel | 1 to 2 mm blisters concentrated at scribe: 4M rating | Primarily at scribe and spot primed area | None | 8 |
| 500 hour Salt Spray | Test Panel 1 | <1 mm at scribe: rating 6 F | Slight at scribe | None | 9 |
| 1000 hour Humidity | Test Panel 2 | 1 blister <1 mm | None | None | 9 |

Table 3 Notes:
1. The results of the salt spray or fog panels is for 500 hours of exposure and the result of the humidity test panel is for 1000 hours of exposure.
2. Both the control and test salt spray or fog panels showed no effect at 250 hours exposure.
3. The salt spray and humidity ratings are expressed as percentages per square foot as follows: 10 = no failure; 9 = 0 to 1%; 8 = 2 to 3%; 7 = 4 to 6%; 6 = 7 to 10%; 5 = 11 to 20%; 4 = 21 to 30%; 3 = 31 to 40%; 2 = 41 to 55%; 1 = 56 to 75%; 0 = over 75%.

As exemplified by the test results described above and illustrated in Tables 2 and 3, the solvent of the present invention is well suited for use as a thinner or solvent with various types of paints, including primer paints and topcoat finishing paints. It is also noted that the primer and topcoat paints using the present solvent are highly suited for application by spraying. In addition to the subsequent test results, one of the key advantages of the present solvent is the elimination or substantial elimination of the use of toluene and the relatively

The invention claimed is:

1. A solvent comprising:

4.0 to 8.0% by volume n-butyl acetate;

8.0 to 16.0% by volume n-heptane;

15.0 to 25.0% by volume methyl ethyl ketone;

8.0 to 16.0% by volume methyl isobutyl ketone;

20.0 to 30.0% by volume acetone; and 20.0 to 30.0% by volume of a light hydrotreated petroleum distillate having a boiling range of about 230 to 320° F., a closed cup flash point of about 35 to 75° F. and a kauri-butanol value not less than 25; wherein the solvent comprises no more than 4.0% by volume of aromatic compounds.

2. The solvent of claim 1 wherein a mixture of 8-carbon and 9-carbon hydrocarbons makes up at least 90% of the petroleum distillate.

3. The solvent of claim 2 wherein at least 90% of the petroleum distillate is made up of at least one of paraffins and cycloparaffins.

4. The solvent of claim 3 wherein the mixture of 8-carbon and 9-carbon hydrocarbons makes up at least 95% of the petroleum distillate.

5. The solvent of claim 4 wherein at least 95% of the petroleum distillate is made up of at least one of paraffins and cycloparaffins.

6. The solvent of claim 1 wherein at least 90% of the petroleum distillate is made up of at least one of paraffins and cycloparaffins.

7. The solvent of claim 1 wherein the flash point of the solvent is within the range of about 50° F. to 75° F.

8. The solvent of claim 7 wherein the flash point of the solvent is within the range of about 55° F. to 70° F.

9. The solvent of claim 1 wherein the acetone and petroleum distillate together make up about 45.0 to 55.0% of the solvent by volume.

10. The solvent of claim 1 wherein the solvent comprises no more than 3.0% by volume of toluene.

11. The solvent of claim 10 wherein the solvent comprises no more than 1.0% by volume of toluene.

12. The solvent of claim 1 wherein the solvent comprises no more than 3.0% by volume of aromatic compounds.

13. The solvent of claim 1 wherein the n-butyl acetate, n-heptane, methyl ethyl ketone, methyl isobutyl ketone, acetone and petroleum distillate together make up at least 90% of the solvent by volume.

14. The solvent of claim 13 wherein the n-butyl acetate, n-heptane, methyl ethyl ketone, methyl isobutyl ketone, acetone and petroleum distillate together make up at least 95% of the solvent by volume.

15. The solvent of claim 1 wherein the solvent contains no more than 5.0% by volume of an aggregate of the chemicals listed as hazardous air pollutants in Title I, Section 112(b)(1) of the United States Clean Air Act, other than methyl isobutyl ketone; wherein the chemicals are listed in Table 1 of the present application.

16. The solvent of claim 1 wherein the solvent comprises no more than 5.0% by volume of a combination of hydrocarbons, alcohols, aldehydes, esters, ethers, or ketones having an olefinic or cyclo-olefinic type of unsaturation.

17. The solvent of claim 1 wherein the solvent comprises no more than 20.0% by volume of a combination of ethylbenzene, ketones having branched hydrocarbon structures, trichloroethylene and toluene.

18. A solvent comprising:
  4.0 to 8.0% by volume n-butyl acetate;
  8.0 to 16.0% by volume n-heptane;
  15.0 to 25.0% by volume methyl ethyl ketone;
  8.0 to 16.0% by volume methyl isobutyl ketone;
  20.0 to 30.0% by volume acetone; and
  20.0 to 30.0% by volume of a light hydrotreated petroleum distillate at least 90% of which is made up of a mixture of 8-carbon and 9-carbon hydrocarbons; wherein the solvent comprises no more than 4.0% by volume of aromatic compounds.

19. A solvent comprising:
  4.0 to 8.0% by volume n-butyl acetate;
  8.0 to 16.0% by volume n-heptane;
  15.0 to 25.0% by volume methyl ethyl ketone;
  8.0 to 16.0% by volume methyl isobutyl ketone;
  20.0 to 30.0% by volume acetone; and
  20.0 to 30.0% by volume of a petroleum distillate which comprises by volume 20 to 50% 8-carbon hydrocarbons and 50 to 80% 9-carbon hydrocarbons; wherein the solvent comprises no more than 4.0% by volume of aromatic compounds.

20. The solvent of claim 12 wherein the solvent comprises no more than 2.0% by volume of aromatic compounds.

21. The solvent of claim 20 wherein the solvent comprises no more than 1.0% by volume of aromatic compounds.

22. The solvent of claim 18 wherein the solvent comprises no more than 3.0% by volume of aromatic compounds.

23. The solvent of claim 22 wherein the solvent comprises no more than 2.0% by volume of aromatic compounds.

24. The solvent of claim 23 wherein the solvent comprises no more than 1.0% by volume of aromatic compounds.

25. The solvent of claim 18 wherein the n-butyl acetate, n-heptane, methyl ethyl ketone, methyl isobutyl ketone, acetone and petroleum distillate together make up at least 95% of the solvent by volume.

26. The solvent of claim 19 wherein the 8-carbon and 9-carbon hydrocarbons together make up at least 95% of the petroleum distillate by volume; and the n-butyl acetate, n-heptane, methyl ethyl ketone, methyl isobutyl ketone, acetone and petroleum distillate together make up at least 95% of the solvent by volume.

27. The solvent of claim 19 wherein the solvent comprises no more than 3.0% by volume of aromatic compounds.

28. The solvent of claim 27 wherein the solvent comprises no more than 2.0% by volume of aromatic compounds.

29. The solvent of claim 28 wherein the solvent comprises no more than 1.0% by volume of aromatic compounds.

* * * * *